(12) United States Patent
Pfannenmüller et al.

(10) Patent No.: US 12,283,739 B2
(45) Date of Patent: Apr. 22, 2025

(54) DUPLEXER ARCHITECTURE USING 90 DEGREE HYBRID COUPLER BASED BALANCING CONDITIONS

(71) Applicant: Apple Inc., Cupertino, CA (US)

(72) Inventors: Christof Pfannenmüller, Erlangen (DE); Dominic Koehler, Viereth-Trunstadt (DE); Harald Pretl, Schwertberg (AT); Rastislav Vazny, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 17/932,275

(22) Filed: Sep. 14, 2022

(65) Prior Publication Data

US 2024/0088538 A1    Mar. 14, 2024

(51) Int. Cl.
| | | |
|---|---|---|
| *H01P 5/22* | (2006.01) | |
| *H04B 1/04* | (2006.01) | |
| *H04B 1/16* | (2006.01) | |
| *H04B 1/48* | (2006.01) | |

(52) U.S. Cl.
CPC ............... *H01P 5/22* (2013.01); *H04B 1/04* (2013.01); *H04B 1/16* (2013.01); *H04B 1/48* (2013.01)

(58) Field of Classification Search
CPC .......... H03H 7/18; H03H 7/425; H03H 7/463; H03H 2210/025; H03H 7/09; H04B 1/48; H04B 1/525; H04B 1/0458; H04B 1/18; H04B 1/44; H04B 1/50; H04B 1/04; H04B 2001/0408; H04B 1/0057; H04B 1/10; H04B 1/16; H04B 1/58; H04L 27/2601
See application file for complete search history.

(56) References Cited

U.S. PATENT DOCUMENTS

| | | |
|---|---|---|
| 2008/0102763 A1 | 5/2008 | Yoon |
| 2009/0190509 A1 | 7/2009 | Yoon |
| 2010/0148886 A1 | 6/2010 | Inoue et al. |
| (Continued) | | |

FOREIGN PATENT DOCUMENTS

| | | |
|---|---|---|
| EP | 2161832 B1 | 4/2011 |
| EP | 1642357 B1 | 11/2011 |

OTHER PUBLICATIONS

Extended European Search Report for European Patent Application No. 23196513.8 dated Feb. 9, 2024; 8 pgs.

*Primary Examiner* — John W Poos
(74) *Attorney, Agent, or Firm* — FLETCHER YODER PC

(57) ABSTRACT

An electronic device may include isolation circuitry coupled between a transmitter, a receiver, and one or more antennas. The isolation circuitry may include a 90 degree hybrid coupler configured receive a transmission (TX) signal from the transmitter, split the TX signal into a first portion and a second portion, and phase-shift a portion such that the portions are +90 degrees out-of-phase. The isolation circuitry may include phase shifters that phase-shift the portions such that the portions are in-phase prior to propagating to the antenna. The phase shifters may receive a first portion and a second portion of a receiver (RX) signal from splitter circuitry. The phase shifters may phase-shift the portions such that the portions are out-of-phase by −90 degrees. The 90 degree hybrid coupler may phase-shift the first portion and/or the second portion such that the portions are in-phase and constructively combine prior to propagating to the receiver.

20 Claims, 10 Drawing Sheets

(56) References Cited

U.S. PATENT DOCUMENTS

| | | | |
|---|---|---|---|
| 2014/0155003 A1 | 6/2014 | Nakatani | |
| 2015/0372360 A1* | 12/2015 | Naeini | H01P 1/18 333/117 |
| 2016/0056945 A1* | 2/2016 | Ellä | H04L 5/04 370/273 |
| 2017/0302429 A1* | 10/2017 | Brighenti | H04B 1/0057 |
| 2019/0326944 A1* | 10/2019 | Khlat | H04B 1/52 |
| 2020/0194897 A1* | 6/2020 | Ananth | H04B 1/525 |
| 2022/0078059 A1 | 3/2022 | Dorn et al. | |

* cited by examiner

DUPLEXER ARCHITECTURE USING 90 DEGREE HYBRID COUPLER BASED BALANCING CONDITIONS

BACKGROUND

The present disclosure relates generally to wireless communication, more specifically to isolation of wireless signals between transmitters and receivers in wireless communication devices.

In an electronic device, a transmitter and a receiver may be coupled to one or more antennas to enable the electronic device to both transmit and receive wireless signals. The electronic device may include isolation circuitry that isolates the transmitter from received signals, and the receiver from transmission signals of a second frequency range to reduce interference when communicating. However, insertion loss may occur from transmission signals leaking into the antenna and received signals leaking to the transmitters, due to components in the isolation circuitry not acting in an ideal manner. As such, systems for achieving high isolation of the wireless signals while maintaining low insertion loss may be desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a communication device may include one or more antennas, a transmit circuit, a receive circuit, splitter circuitry coupled to the one or more antennas, at least one phase shifter coupled to the splitter circuitry, and a 90 degree hybrid coupler coupled to the at least one phase shifter, the transmit circuit, and the receive circuit. The splitter circuitry may be configured to split a signal received at the one or more antennas into a first portion and a second portion. The at least one phase shifter may be configured to shift the first portion of the signal and the 90 degree hybrid coupler may be configured to shift the first portion of the signal and constructively combine the first portion of the signal and the second portion of the signal.

In another embodiment, a communication device may include one or more antennas, a transmit circuit, a receive circuit, isolation circuitry coupled to the one or more antennas, the transmit circuit, and the receive circuit. The isolation circuitry may include a 90 degree hybrid coupler and at least one phase shifter. The 90 degree hybrid coupler may be configured to receive a signal from the transmit circuitry, split the signal into a first portion and a second portion, phase-shift the first portion of the signal, and the at least one phase shifter configured to phase-shift a second portion of the signal such that the first portion and the second portion are in phase.

In yet another embodiment, isolation circuitry may include at least one phase shifter coupled to one or more antennas and configured to phase-shift a first portion of a receive signal from the one or more antennas, a second portion of the receive signal, or both and a 90 degree hybrid coupler coupled to the at least one phase shifter, a transmit circuit, and a receive circuit. The 90 degree hybrid coupler may be configured to combine the first portion and the second portion of the receive signal and the second portion of the receive signal and split a transmission signal from the transmit circuit.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
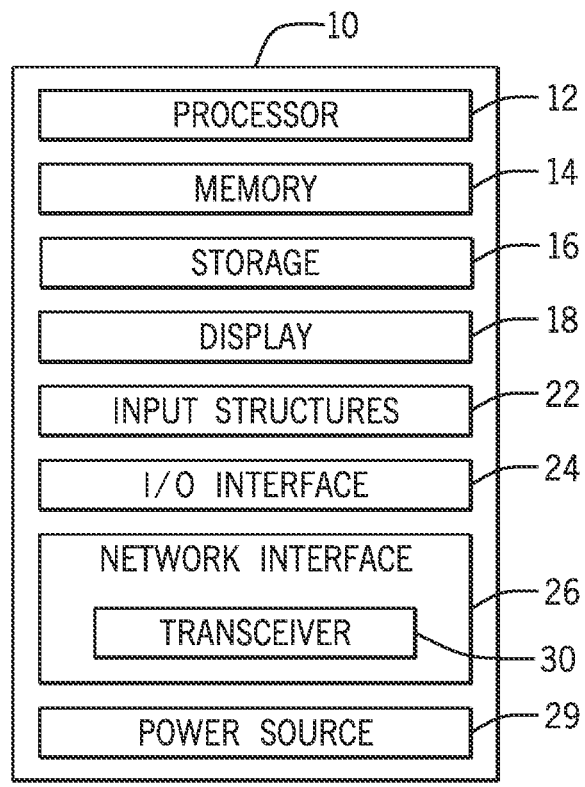
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to isolating wireless signals between transmitters and receivers in electronic devices (e.g., a wireless communication device) using a duplexer, such as a phase balanced duplexer (PBD), Wheatstone balanced duplexer (WBD), a double balanced duplexer (DBD), a circular balanced duplexer (CBD), or any other duplexer used to isolate wireless signals between transmitters and receivers). The duplexer may be coupled to tunable elements (e.g., phase shifters, impedance tuners, antenna tuner) to alter isolation performance and insertion loss (e.g., loss resulting from the components of the duplexer providing less than ideal isolation of the transmission and/or received signals) between the transmitter, the receiver, and/or one or more antennas coupled to the transmitter and the receiver. However, insertion loss may occur from transmission (TX) signals transmitted from the receiver to the antenna leaking into the receiver and/or received (RX) signals received at the antenna leaking into the transmitter due to components of the duplexer (e.g., resistive devices such as resistors, inductive devices such as inductors, capacitive devices such as capacitors) not acting in ideal or as-designed manner.

Embodiments herein provide various apparatuses and techniques to balance conditions of the duplexer such that isolation and insertion loss between the transmitter, the receiver, and one or more antennas may be improved or optimized. In particular, the duplexer may include a 90 degree hybrid coupler (e.g., 90 hybrid circuitry) coupled between the transmitter and the receiver that isolates transmission signals from the receiver and received signals from the transmitter. In certain instances, the 90 degree hybrid coupler may be coupled to the transmitter via a first port, a first phase shifter via a second port, a second phase shifter via a third port, and the receiver via a fourth port. The transmitter and the receiver may be coupled to opposite ports (e.g., the first port and the fourth port) of the 90 degree hybrid coupler and the 90 degree hybrid coupler may operate such that coupling (e.g., direct transmission) between opposite ports may be reduced or eliminated. In this way, high isolation between the transmitter and the receiver may be achieved. In operation, the 90 degree hybrid coupler may receive a transmission (TX) signal from the transmitter at the first port and split the TX signal into a first portion and a second portion. The 90 degree hybrid coupler may phase shift the first portion of the signal +90 degrees and the second portion of the signal 0 degrees. The first portion of the TX signal may propagate to the second port and to the first phase shifter, while the second portion of the TX signal may propagate to the third port and to the second phase shifter. In certain instances, the phase shifters may shift the portions of the signals to cause the portions be in phase, such that they constructively combine at combiner circuitry prior to propagating to the one or more antennas. In this way, insertion loss that may have resulted from splitting the signal may be recovered and isolation may be improved or optimized.

In another example, the one or more antennas may receive a receiver (RX) signal for propagating to the receiver. The combiner circuitry may split the RX signal into a first portion and a second portion and the portions may propagate to the phase shifters. In certain instances, the combiner circuitry may phase-shift the first portion or the second signal. The first portion of the RX signal may propagate to the first phase shifter and the second port of the 90 degree hybrid coupler while the second portion of the RX signal may propagate to the second phase shifter and to the third port of the 90 degree hybrid coupler. However, the portions of the signal may not achieve a desired phase (e.g., target phase) and/or an impedance of the first phase shifter may not match an impedance of the second phase shifter. As such, an input impedance (e.g., impedance at the second port and the third port of the 90 degree hybrid coupler) may be mismatched (e.g., unbalanced), resulting in the 90 degree hybrid coupler providing less than ideal isolation. In an embodiment, the 90 degree hybrid coupler may be coupled to a first impedance tuner via the second port and a second impedance tuner via the third port. The impedance tuners may be configured (e.g., tuned, adjusted) to balance the input impedances of the 90 degree hybrid coupler. With balanced input impedances, the impedance of the 90 degree hybrid coupler may provide improved (e.g., infinite or near infinite) isolation between the transmitter, the receiver, and one or more antennas.

In certain instances, the portions of the signals may propagate to the first port instead of the fourth port. The 90 degree hybrid coupler may phase-shift the second portion of the signal such that the first portion and the second portion may be 180 degrees out of phase. As such, the portions of the signal may destructively combine at the first port. In this way, the 90 degree hybrid coupler may reduce or eliminate unwanted RX signals from propagating to the transmitter.

In some embodiments, the combiner circuitry may include a 90 degree hybrid coupler coupled to the one or more antennas, the first phase shifter, the second phase shifter, and an antenna tuner. For example, the 90 degree hybrid coupler may receive the RX signal from the one or more antennas and split the signal into a first portion and a second portion. The 90 degree hybrid coupler may phase-shift a first portion, a second portion, or both, prior to propagating the portions to the phase shifters 102. The antenna tuner may match or mirror an impedance of the one or more antennas to provide high isolation between the combiner circuitry and the duplexer coupled to the phase shifters. In another example, the 90 degree hybrid coupler may receive a first portion of the TX signal and the second portion of the TX signal prior to propagating the portions to the one or more antennas. The 90 degree hybrid coupler may phase-shift a first portion, a second portion, or both, and combine the portions prior to propagating the TX signal to the one or more antennas. The 90 degree hybrid coupler may phase-shift the portions such that the portions may be in phase and constructively combine. As such, power lost by splitting the TX signal may be recovered and low insertion loss may be achieved. In this way, high isolation and low insertion loss between the transmitter, the receiver, and the one or more antennas may be achieved.

With the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a 6th generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
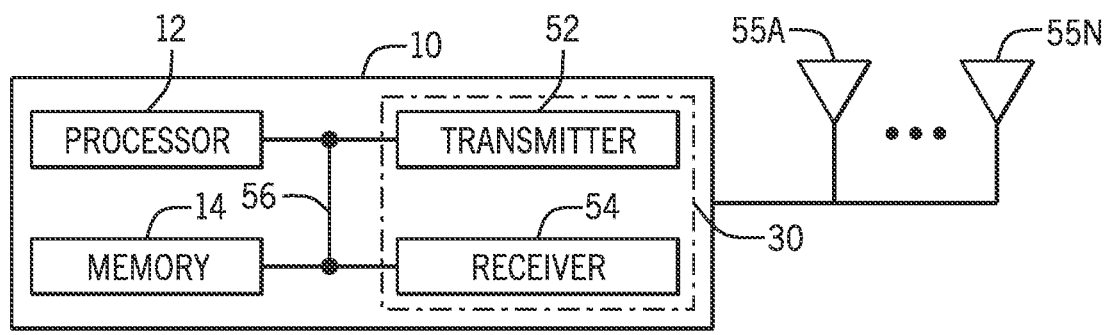
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
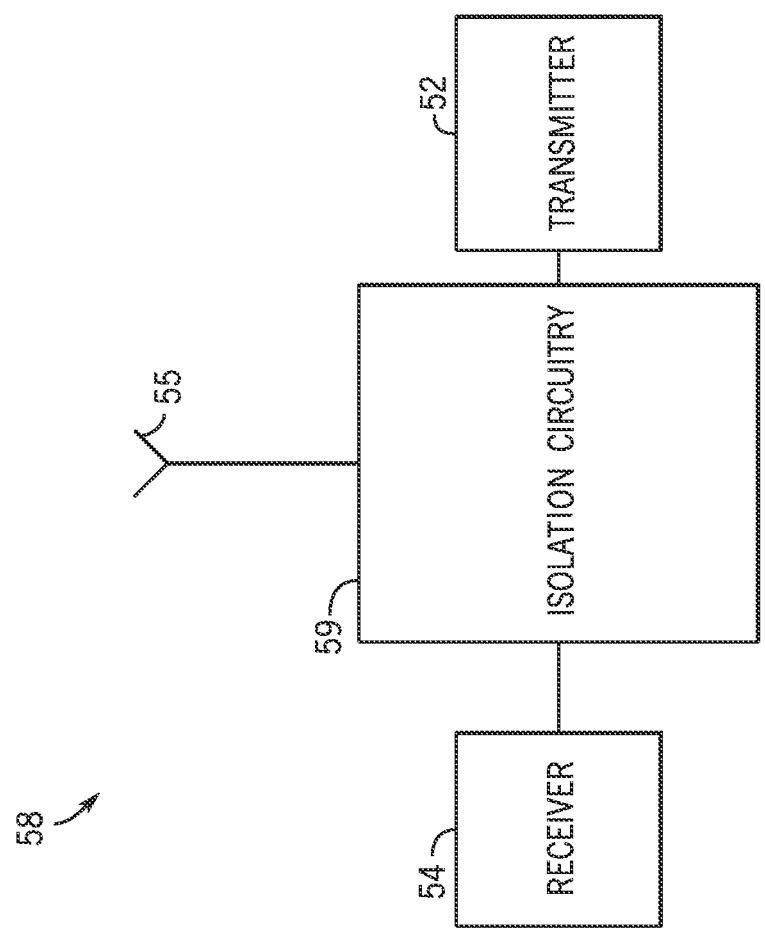
FIG. 3 is a schematic diagram of a radio frequency front end (RFFE) of the electronic device of FIG. 1 having isolation circuitry that isolates a transmitter of FIG. 2 from received signals of a first frequency range, and isolates a receiver of FIG. 2 from transmission signals of a second frequency range, according to embodiments of the present disclosure.

FIG. 3 is a schematic diagram of a radio frequency front end (RFFE) 58 of the electronic device 10 having isolation circuitry 59 that isolates the transmitter 52 from received signals of a first frequency range, and isolates the receiver 54 from transmission signals of a second frequency range, according to embodiments of the present disclosure. The RFFE 58 may include components of the electronic device 10 that receive as input, output, and/or process signals having radio frequency, including at least some components (e.g., the power amplifier 66, the filter 68) of the transmitter 52, at least some components (e.g., the low noise amplifier 82, the filter 84) of receiver 54, and the isolation circuitry 59. As illustrated, the isolation circuitry 59 is communicatively coupled between the transmitter 52 and the receiver 54, as well as the one or more antennas 55. The isolation circuitry 59 enables signals (e.g., transmission or uplink signals) of the first frequency range (e.g., a transmission or uplink frequency range) from the transmitter 52 to pass through to the one or more antennas 55 and blocks the signals of the first frequency range from passing through to the receiver 54. The isolation circuitry 59 also enables signals (e.g., received or downlink signals) of a second frequency range (e.g., a receive or downlink frequency range) received via the one or more antennas 55 to pass through to the receiver 54 and blocks the received signals of the second frequency range from passing through to the transmitter 52. Each frequency range may be of any suitable bandwidth, such as between 0 and 100 gigahertz (GHz) (e.g., 10 megahertz (MHz)), and include any suitable frequencies. For example, a first transmission frequency range may be between 740 and 790 MHz, and a first receiver frequency range may be between 820 MHz and 860 MHz.

Due to a non-ideal nature of components of the isolation circuitry 59, when isolating the receiver 54 from a transmission signal generated by the transmitter 52, some of the transmission signal (e.g., a transmit leakage signal) may propagate toward the receiver 54. If a frequency of the transmit leakage signal is within the receive frequency range (e.g., is a frequency supported by the receiver 54), the transmit leakage signal may interfere with a receive signal and/or the receiver 54. Similarly, when isolating the transmitter 52 from a received signal received via the one or more antennas 55, some of the received signal (e.g., a receive leakage signal) may propagate toward the transmitter 52. If a frequency of the receive leakage signal is within the transmit frequency range (e.g., is a frequency supported by the transmitter 52), the receive leakage signal may interfere with the transmit signal and/or the transmitter 52. These leakage signals may be referred to as insertion loss.

Figure 4:
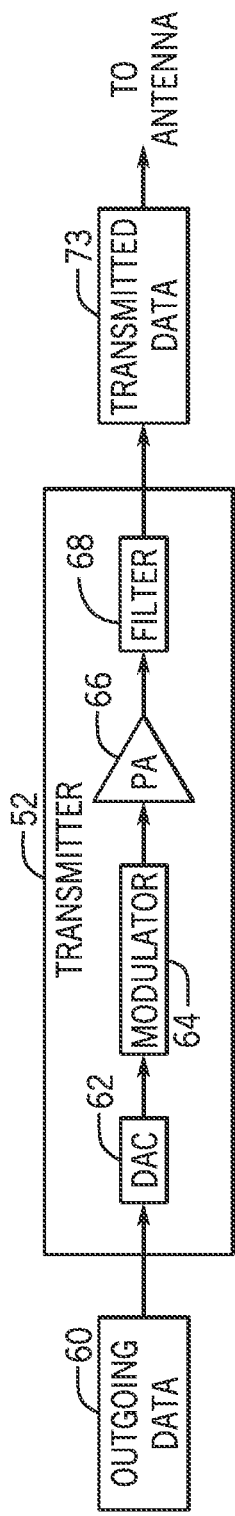
FIG. 4 is a schematic diagram of a transmitter of the electronic device of FIG. 1, according to embodiments of the present disclosure.

FIG. 4 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE) 58, and more specifically, a transmit front end (TXFE) of the electronic device 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 5:
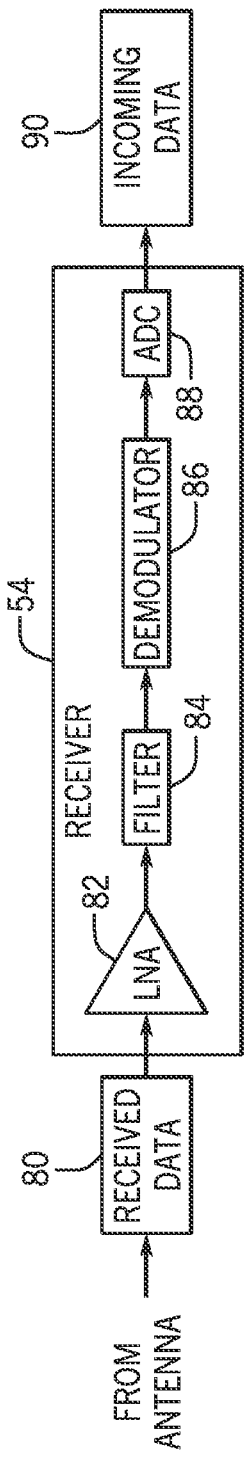
FIG. 5 is a schematic diagram of a receiver of the electronic device of FIG. 1, according to embodiments of the present disclosure.

FIG. 5 is a schematic diagram of the receiver 54 (e.g., receive circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. The low noise amplifier 82 and/or the filter 84 may be referred to as part of the RFFE 58, and more specifically, a receiver front end (RXFE) of the electronic device 10.

A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter.

Figure 6:
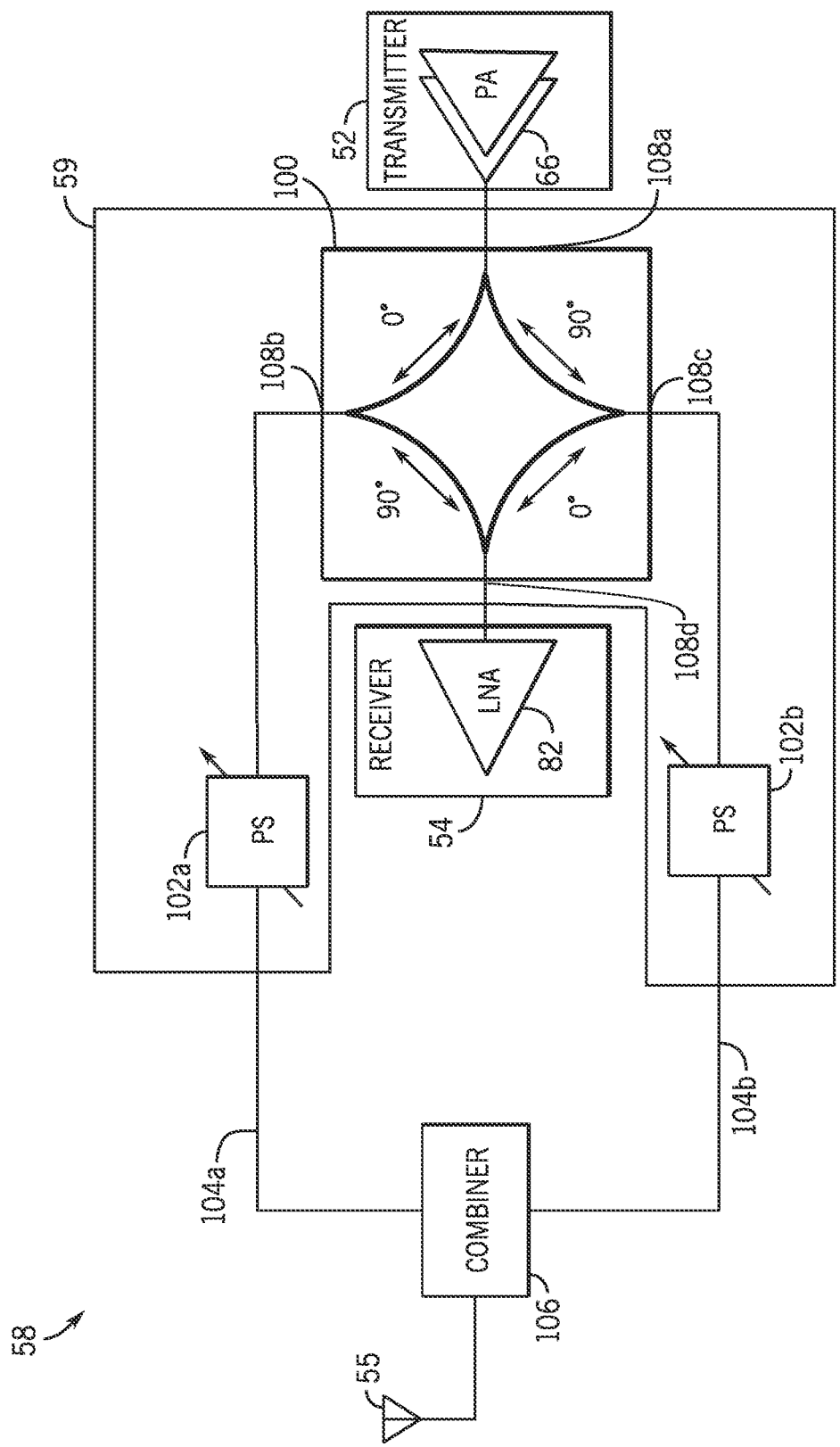
FIG. 6 is a circuit diagram of the RFFE of FIG. 3 having isolation circuitry that includes a duplexer in the form of a 90 degree hybrid coupler and at least one phase shifter, according to embodiments of the present disclosure.

FIG. 6 is a circuit diagram of the RFFE 58 having isolation circuitry 59 that includes a duplexer 100 in the form of a 90 degree hybrid coupler 100 and at least one phase shifter 102, according to embodiments of the present disclosure. As illustrated, the isolation circuitry 59 is disposed between and coupled to the transmitter 52 and the receiver 54. The isolation circuitry 59 may isolate the transmitter 52 from received signals of the first frequency range, and isolate the receiver 54 from transmission signals of the second frequency range. The isolation circuitry 59 may include tunable components (e.g., one or more phase shifters, impedance tuners, antenna tuners, and so on) to alter isolation performance and insertion loss (e.g., loss resulting from components of the duplexer 100 providing less than ideal isolation of the transmission and/or received signals) between the transmitter 52, the receiver 54, and/or the antenna 55 coupled to the transmitter 52 and receiver 54.

Additionally or alternatively, a first path 104a and a second path 104b (collectively referred to as path 104) may each couple the isolation circuitry 59 to the antenna 55 via combiner circuitry 106. The first path 104a and the second path 104b may each include a bidirectional path along which a portion of a signal to be transmitted (e.g., a transmission (TX) signal) from the transmitter 52 has been split at the duplexer 100 and travels to the antenna 55. Similarly, a signal received via the antenna 55 (e.g., receiver (RX) signal) may be split at the combiner circuitry 106 and travel along the first path 104a and the second path 104b to the receiver 54.

A first phase shifter 102a, and a second phase shifter 102b (collectively referred to as phase shifters 102) may be disposed on the first path 104a and the second path 104b, respectively. The phase shifters 102 may be individually tunable and shift a phase of a signal based on an algorithm, machine learning, a lookup table, or the like. The phase shifters 102 may be bidirectional phase shifters and shift the (RX) signal propagating from the antenna 55 to the isolation circuitry 59, as well as the (TX) signal propagating from the isolation circuitry 59 to the antenna 55. In particular, a phase output of the first phase shifter 102a may be −90 degrees out of phase when compared to a phase output by the second phase shifter 102b (e.g., for RX signals received by the antenna 55 and output to the duplexer 100). That is, the first phase shifter 102a may shift an RX signal −90 degrees while the second phase shifter 102b may shift an RX signal 0 degrees. In another example, the first phase shifter 102a may receive a first signal and the second phase shifter 102b may receive a second signal that may be +90 degrees out of phase when compared to the first signal (e.g., for TX signals propagating from the duplexer 100). The phase shifters 102 may phase-shift a first TX signal and a second TX signal such that they are substantially in phase and constructively combine. As such, the first phase shifter 102a may shift the first TX signal +90 degrees while the second phase shifter 102b may phase shift the second TX signal 0 degrees. However, the phase shifters 102 may also phase-shift the signal by ±360 degrees, ±720 degrees, and so on, which may be added to the nominal phase values discussed herein.

The phase shifters 102, as further discussed with respect to FIGS. 12-14 below, may be individually tunable and be set to a functionality (e.g., transition frequency, phase-shift) that facilitates blocking or pass through of certain frequencies. For example, the phase shifters 102 may include or be configured with a transition frequency at which the phase shifter 102 transitions from providing a 0 degree to ±90 degree phase-shift, from 0 degree to −±180 degree phase-shift, ±270 degree to ±360 phase-shift, and so on.

As illustrated, the duplexer 100 may include a 90 degree hybrid coupler (e.g., hybrid circuitry), though the duplexer 100 may be any suitable duplexer used to isolate wireless signals between the transmitter 52 and the receiver 54, such as a balun, a hybrid that applies a different phase shift (e.g., a 180 degree hybrid), a phase balanced duplexer (PBD), Wheatstone balanced duplexer (WBD), a double balanced duplexer (DBD), a circular balanced duplexer (CBD), and or any suitable circuitry that may phase shift (e.g., by 90 degrees). The 90 degree hybrid coupler 100 may include a first port 108a, a second port 108b, a third port 108c, and a fourth port 108d (collectively referred to as ports 108). Each port 108 may operate as an input for an incoming signal and may output the incoming signal to an adjacent port, but may not output the incoming signal to the opposite port based on signal pathways of the 90 degree hybrid coupler 100. For example, a first port 108a may receive an input signal and the 90 degree hybrid coupler 100 may split the signal into a first portion and a second portion. The first portion of the signal may propagate from the first port 108a to the second port 108b and the second portion of the signal may propagate from the first port 108a to the third port 108c. However, because the signal pathways of the 90 degree hybrid coupler 100 prevent, block, or otherwise do not enable signals to pass from one port (e.g., 108a) to an opposite (e.g., non-adjacent) port (e.g., 108d), signal transmission between the first port 108a and the fourth port 108d may be reduced or eliminated.

For example, the 90 degree hybrid coupler 100 may be coupled to the transmitter 52 (e.g., the power amplifier (PA) 66 of the transmitter 52) via a first port 108a, the first phase shifter 102a via a second port 108b, the second phase shifter 102b via a third port 108c, and the receiver 54 (e.g., the low noise amplifier (LNA) 82 of the receiver 54) via a fourth port 108d. An input signal (e.g., a transmission signal from the transmitter 52) entering the first port 108a may propagate to either the second port 108b and/or the third port 108c, while direct transmission to the fourth port 108d may be reduced or eliminated. In another example, the 90 degree hybrid coupler 100 may receive a TX signal from the transmitter 52 coupled to the first port 108a. The 90 degree hybrid coupler 100 may split the TX signal a first portion and a second portion and phase-shift a portion of the signal such that it is +90 degrees out of phase compared to the other portion of the TX signal. For example, the first portion of the TX signal split at the first port 108a may be phase-shifted 0 degrees by the 90 degree hybrid coupler 100 and propagated to the second port 108b, while the second portion of the TX signal split at the first port 108a may be phase-shifted +90 degrees by the 90 degree hybrid coupler 100 and propagated to the third port 108c. Then, the first portion of the TX signal may propagate to the first phase shifter 102a and the second portion of the TX signal may propagate to the second phase shifter 102b. As a result, the first portion of the TX signal received by the first phase shifter 102a may be −90 degrees out of phase compared to the second portion of the TX signal as phase-shifted by the 90 degree hybrid coupler 100. In certain instances, the phase shifters 102 may phase-shift a portion of the TX signal to substantially correlate or match a phase of the portion of the TX signal along the other path 104. For example, the second phase shifter 102b may phase-shift the second portion of the TX signal by +90 degrees so that the second portion of the TX signal may be substantially in phase with the first portion of the TX signal. In this way, the first portion and the second portion of the TX signal may constructively combine via the combiner circuitry 106 prior to propagating to the antenna 55. As such, power lost due to the 90 degree hybrid coupler 100 splitting the TX signal may be recovered. In other words, insertion loss caused by splitting the TX signal at the isolation circuitry 59 may be reduced or eliminated by combining the first path 104a and the second path 104b via the combiner circuitry 106.

In another example, the 90 degree hybrid coupler 100 may receive a first portion of an RX signal (e.g., a first portion of signal received from the antenna 55, split by the combiner circuitry 106, and phase-shifted by the phase shifter 102a) at the second port 108b and a second portion of the RX signal (e.g., a second portion of the signal split by the combiner circuitry 106 and phase-shifted by the phase shifter 102b) at the third port 108c. As mentioned above, the first portion of the RX signal may be phase-shifted by the first phase shifter 102a such that it is −90 degrees out of phase compared to the second portion of the RX signal as phase-shifted by the second phase shifter 102b. As a result, the first portion of the RX signal received at the second port 108b may be phase-shifted +90 degrees by the 90 degree hybrid coupler 100 and propagated to the fourth port 108d, while the second portion of the RX signal received at the third port 108c may be phase-shifted 0 degrees by the 90 degree hybrid coupler 100 and also propagate to the fourth port 108d. As such, the phase-shifted first portion of the signal may have a 0 degree phase difference at the fourth port 108d compared to the second portion of the RX signal output at the fourth port 108d, and the portions may constructively combine before propagating to the receiver 54.

Moreover, if the first portion of the RX signal and/or the second portion of the RX signal attempt to leak to the transmitter 52 by propagating to the first port 108a, they may destructively combined. For example, as described above, the first portion of the RX signal may be phase-shifted by the first phase shifter 102a such that it is −90 degrees out of phase compared to the second portion of the RX signal as phase-shifted by the second phase shifter 102b. The first portion of the RX signal may propagate from the second port 108b to the first port 108a and may be phased-shifted by 0 degrees by the 90 degree hybrid coupler 100, and the second portion of the RX signal may propagate from the third port 108c to the first port 108a and may be phase-shifted +90 degrees by the 90 degree hybrid coupler 100. Accordingly, at the fourth port 108d, the first portion may have a 180 degree phase difference compared to the second portion of the signal. As such, the first portion and the second portion may cancel or destructively combine and signal transmission to the first port 108a may be reduced or eliminated. In this way, the 90 degree hybrid coupler 100 may reduce or eliminate an RX signal leaking from the antenna 55 to the transmitter 52, thereby decreasing RX insertion loss.

Figure 7:
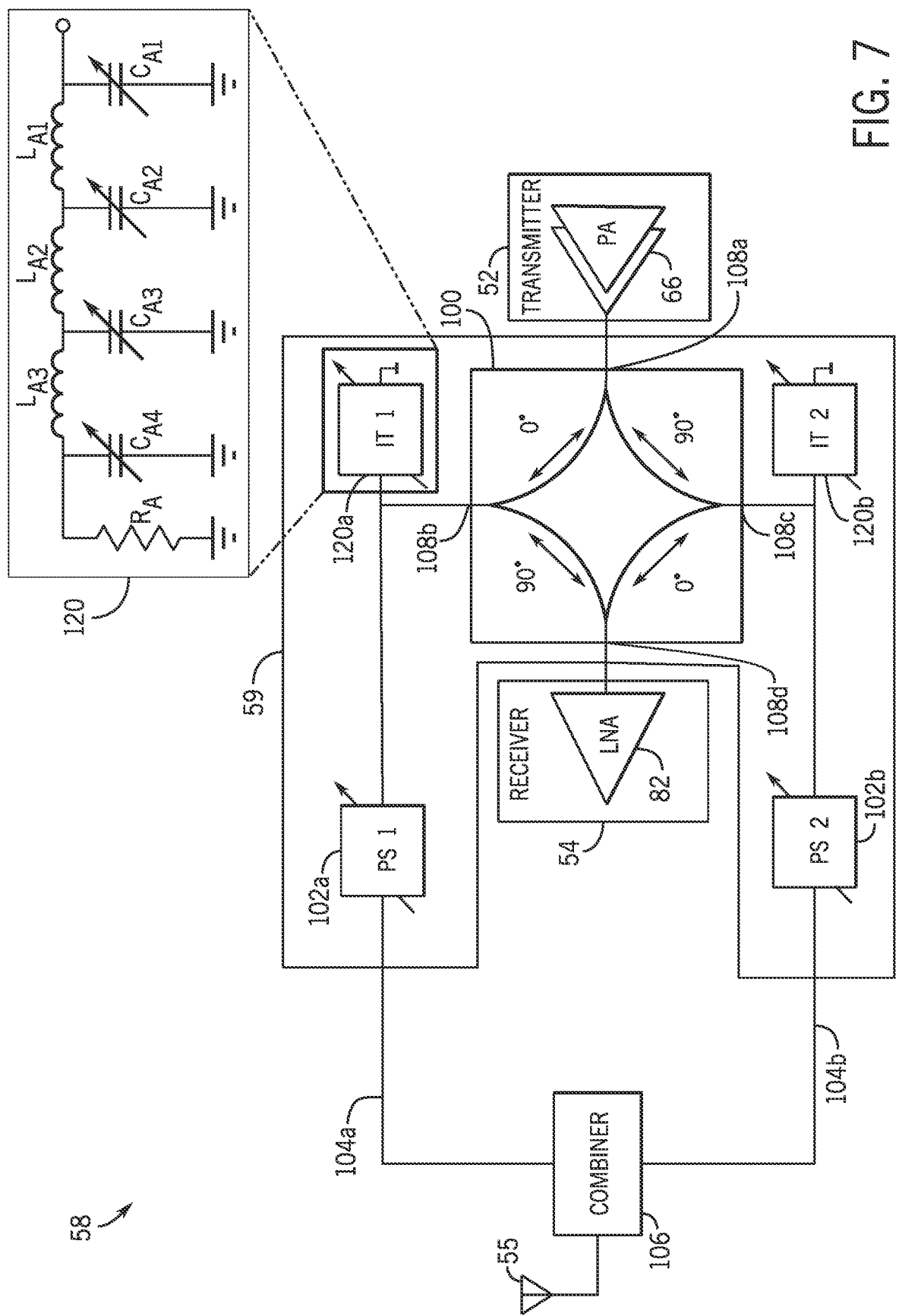
FIG. 7 is a circuit diagram of the RFFE of FIG. 6 having at least one impedance tuner to balance impedance of the 90 degree hybrid coupler, according to embodiments of the present disclosure.

FIG. 7 is a circuit diagram of the RFFE 58 of FIG. 6 having at least one impedance tuner 120 coupled to the 90 degree hybrid coupler 100 to balance impedance at the 90 degree hybrid coupler 100, according to embodiments of the present disclosure. The 90 degree hybrid coupler 100 may use electrical balancing at the ports 108a-d (collectively 108) to isolate wireless signals between the transmitter 52 and the receiver 54. Isolation between the transmitter 52 and the receiver 54 may be increased or achieved when an input impedance at the second port 108b and the third port 180c are the same or substantially similar In certain instances, the input impedance at the second port 108b and the third port 180c of the 90 degree hybrid coupler 100 may be unbalanced or mismatched causing the 90 degree hybrid coupler 100 to not act in an ideal manner. For example, the impedance mismatch may be caused by the phase shifters 102 not accurately phase shifting (e.g., to a target or goal phase).

To balance the 90 degree hybrid coupler 100, at least one impedance tuner 120 may be coupled to the second port 108b and/or the third port 108c to match the input impedances of the 90 degree hybrid coupler 100. The impedance tuner 120 may include one or more resistive elements (e.g., resistors), one or more capacitive elements (e.g., capacitors), one or more inductive elements (e.g., inductors), or any other suitable circuitry to provide a desired impedance. Any or all of the components of the impedance tuner 120 may be tunable or adjustable. For example, as illustrated, the impedance tuner 120 may include a resistor coupled to a ground, four variable capacitors respectively coupled to the ground, and three inductors. The impedance tuner 120 (e.g., the variable capacitors of the impedance tuner 120) may be configured (e.g., adjusted, tuned) to adjust (e.g., lower, raise, maintain) an impedance at a port 108 of the 90 degree hybrid coupler 100 (e.g., to match an impedance at another port 108 of the 90 degree hybrid coupler 100).

As illustrated, a first impedance tuner 120*a* and a second impedance tuner 120*b* (collectively referred to as impedance tuner 120) may be respectively coupled to the second port 108*b* and the third port 108*c* of the 90 degree hybrid coupler 100. While the illustrated example includes the first impedance tuner 120*a* and the second impedance tuner 120*b*, any suitable number of impedance tuners 120 may be coupled to the 90 degree hybrid coupler 100. For example, only one impedance tuner 120 may be coupled to the second port 108*b* and/or the third port 108*c* to balance the input impedance from the second phase shifter 102*b* and/or the first phase shifter 102*a*.

If input impedances at the ports 108 of the 90 degree hybrid coupler 100 are mismatched, then an impedance tuner 120 may adjust (e.g., increase, decrease) an impedance at least one port 108 (e.g., second port 108*b*, third port 108*c*) to balance the input impedances. In particular, a phase shifter 102 may have not accurately producing a target phase shift (e.g., +90 degrees, −90 degrees, +180 degrees, −180 degrees, and so on) due to, for example, manufacturing imperfections, environmental factors, or any other real world considerations, thereby changing the input impedance. This may result in providing an impedance that does not match an impedance at the other phase shifter 102. Accordingly, the impedance tuner 120 may compensate for the mismatched impedances. For example, the second phase shifter 102*b* may not accurately produce a target phase shift (e.g., of 0 degrees), and, as a result, may produce a slightly lower impedance compared to input impedance of the first phase shifter 102*a*. To compensate for the lower impedance of the second phase shifter 102*b*, the impedance tuners 120 may generate impedances that, when combined with the impedance of the second phase shifter 102*b*, causes impedance at the third port 108*c* to match an impedance at the second port 108*b*. For example, the first impedance tuner 120*a* may lower an impedance at the second port 108*b* and/or the second impedance tuner 120*b* may increase an impedance at the third port 108*c*. In this way, the input impedances at the second port 108*b* and the third port 108*c* may be balanced, thus enabling the 90 degree hybrid coupler 100 to produce high (e.g., infinite or near infinite) isolation between the transmitter 52 and the receiver 54. If the input impedances at the second port 108*b* and the third port 108*c* are the same or substantially similar, then the processor 12 may configure the impedance tuners 120 to operate in an idle state and have a high impedance (e.g., a maximum impedance, above a threshold impedance) to block an input signal from passing through. In this way, the impedance tuners 120 may not affect the input impedance at ports 108 of the 90 degree hybrid coupler 100.

In certain embodiments, the input impedance of the 90 degree hybrid coupler 100 may be measured in real time (or near real time) to configure the impedance tuners 120. For example, the RFFE 58 may include additional circuitry to measure the input impedance at the first port and the second port of the 90 degree hybrid coupler 100. In another example, the input impedances of the first phase shifter 102*a* and the second phase shifter 102*b* may be measured to configure the impedance tuners 120. In other embodiments, the input impedance may be determined by measuring impedance at the transmitter 52 and/or the receiver 54. When the RFFE 58 is operational, a power of the transmitter 52 (e.g., at an output of the PA 66) may be high while a power of the receiver 54 (e.g., at an input of the LNA 82) may be low. The power of the receiver 54 may be measured in real time (or near real time) to determine isolation between the receiver 54 and the transmitter 52. Poor isolation between the receiver 54 and the transmitter 52 may be determined when the power of the receiver 54 is excessively high (e.g., above a threshold power level) since unwanted signal transmission from the transmitter 52 may be affecting the receiver 54, resulting in the excessively high receive power. As such, in some embodiments, the processor 12 may adjust the impedance tuners 120 to balance impedance at the ports 108*b*, 108*c* based on the receiver 54 receiving excessively high power to improve isolation. In an embodiment, the impedances of the isolation circuitry 59 may be determined during manufacturing and stored in the memory 14 or the storage 16 of the electronic device (e.g., in a data structure, such as a lookup table). For example, when the antenna 55 changes impedance, the phase shifters 102 may also change the input impedance. These changes may be stored in the memory 14 or the storage 16 (e.g., in a lookup table) as inputs (e.g., impedance, bandwidth usage, frequency) for configuring the impedance tuners 120 to balance the 90 degree hybrid coupler 100. In this way, high isolation between the transmitter 52 and the receiver 54 may be achieved by balancing impedance at the ports 108 of the 90 degree hybrid coupler 100.

As described herein, the RFFE 58 may include combiner circuitry 106 that splits a signal from the antenna 55 or combine two signals prior to propagating to the antenna 55. The combiner circuitry 106 may be coupled to the first phase shifter 102*a* via the first path 104*a*, the second phase shifter 102*b* via the second path 104*b*, and the antenna 55, and may also be referred to as splitter circuitry. The combiner circuitry 106 may combine phase-shifted TX signals from the phase shifters 102 and provide the combined signal to the antenna 55 to be transmitted therefrom. The combiner circuitry 106 may also split the RX signal from the antenna 55 into a first portion and a second portion. In certain instances, the first portion and the second portion of the RX signal may be in phase or substantially in phase. In other instances, the combiner circuitry 106 may shift a phase of the first portion of the RX signal, the second portion of the RX signal, or both. The combiner circuitry 106 may include any radio frequency (RF) combiner or splitter circuit, such as a balun, a Wilkinson power divider, a capacitor, a node, a 90 degree hybrid coupler, a 180 degree isolator, or the like. Additionally or alternatively, the combiner circuitry 106 may include passive circuitry, direct connections (e.g., star crossing), or any suitable circuitry that combines signals from the first phase shifter 102*a* via the first path 104*a* and the second phase shifter 102*b* via the second path 104*b* prior to propagating to the antenna 55.

Figure 8:
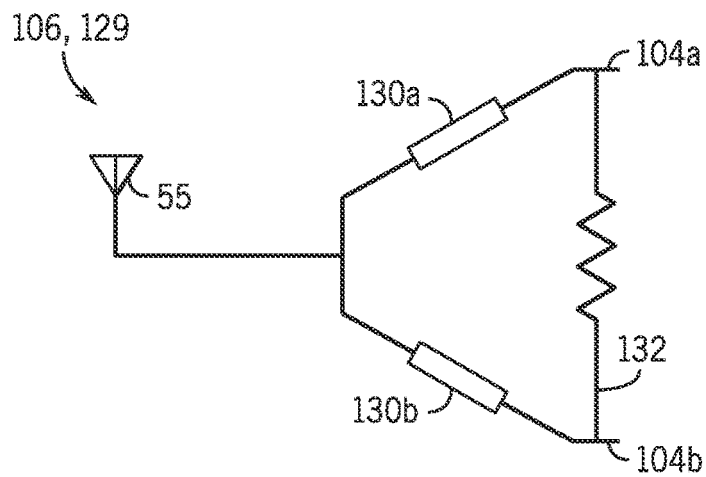
FIG. 8 is a circuit diagram of combiner circuitry in the form of a Wilkinson power divider, according to embodiments of the present disclosure.

With the foregoing in mind, FIG. 8 is a circuit diagram of the combiner circuitry 106 in the form of a Wilkinson power divider 129, according to embodiments of the present disclosure. In an embodiment, the combiner circuitry 106 may include a Wilkinson power divider 129 that splits the RX signal or combines a first portion and a second portion of the TX signal. The Wilkinson power divider 129 may include a first transmission line 130a and a second transmission line 130b (collectively referred to as transmission lines 130). In certain instances, the transmission lines 130 may include inductors, wires, or any suitable circuitry to propagate a first portion and a second portion of a signal. In particular, a transmission line 130 may include a specialized cable or other structure designed to conduct electromagnetic waves in a contained manner In particular, the transmission lines 130 may include conductors that are sufficiently long that a wave nature of a transmission or received signal is taken into account. A length of the transmission line 130 may be controlled or selected based on a frequency of interest (e.g., a transmission frequency, a receive frequency) of the transmission or received signal. When receiving an RX signal, the Wilkinson power divider 129 may split the RX signal into a first portion and a second portion that may be substantially in phase. When receiving two portions of a TX signal, the Wilkinson power divider 129 may constructively combine the two portions that may be in phase or destructively combine the two portions that may be out of phase to output the TX signal.

Figure 9:
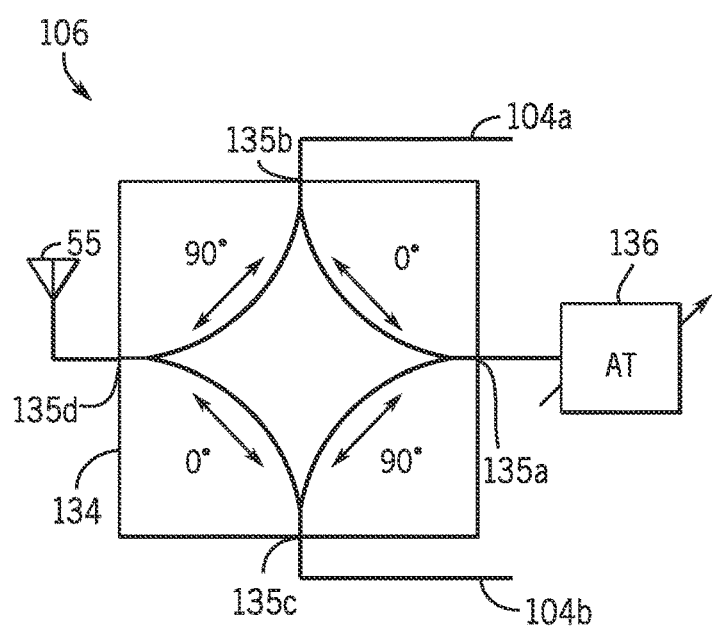
FIG. 9 is a circuit diagram of combiner circuitry in the form of a 90 degree hybrid coupler and an antenna tuner, according to embodiments of the present disclosure.

FIG. 9 is a circuit diagram of the combiner circuitry 106 in the form a 90 degree hybrid coupler 134 and an antenna tuner 136, according to embodiments of the present disclosure. In an embodiment, the combiner circuitry 106 may include a duplexer coupler 134 coupled to an antenna tuner 136. As illustrated, the duplexer coupler 134 may include a 90 degree hybrid coupler 134, which may be similar or identical to the duplexer 100 (e.g., 90 degree hybrid coupler, 90 degree hybrid circuitry) described with respect to FIG. 6, though, in additional or alternative embodiments, the duplexer may include a 180 degree isolator, a combiner circuitry such as a phase balanced duplexer (PBD), a Wheatstone duplexer, or the like. The 90 degree hybrid coupler 134 may include a first port 135a, a second port 135b, a third port 135c, and a fourth port 135d (collectively referred to as ports 135); the ports 135 may allow for four connections, such as to the antenna 55, the first phase shifter 102a via the first path 104a, the second phase shifter 102b via the second path 104b, and the antenna tuner 136. Indeed, each port 135 may operate as an input for an incoming signal and may output the incoming signal to an adjacent port, but may not output the incoming signal to the opposite port, based on the signal pathways of the 90 degree hybrid coupler 134. That is, the signal pathways of the 90 degree hybrid coupler 134 prevent, block, or otherwise do not enable signals to pass from one port (e.g., 135d) to an opposite (e.g., non-adjacent) port (e.g., 135d).

In an example, the 90 degree hybrid coupler 134 may receive a first portion of a TX signal (e.g., a first portion of a signal from the transmitter 52 for the antenna 55) at the second port 135b and a second portion of the TX signal (e.g., a second portion of the signal from the transmitter 52 for the antenna 55) at the third port 135c. In certain instances, the first portion may be phase-shifted by the first phase shifter 102a (e.g., by −90 degrees) and the second portion may be phase-shifted by the second phase shifter 102b (e.g., by 0 degrees), such that the first portion is out of phase with the second portion by −90 degrees. As such, the first portion of the TX signal may be phase-shifted +90 degrees by the 90 degree hybrid coupler 134 and propagated to the fourth port 135d, and the second portion of the TX signal may be phase-shifted 0 degrees by the 90 degree hybrid coupler 134 and also propagate to the fourth port 135d. Accordingly, because the phase-shifted first portion of the TX signal may have a 0 degree phase difference compared to the second portion of the TX signal, the portions may constructively combine at the fourth port 135d before propagating to the antenna 55. In certain instances, the first portion and the second portion of the TX signal may attempt to leak or propagate to the first port 135a. In such cases, the first portion may propagate from the second port 135b to the first port 135a and be phase-shifted 0 degrees, while the second portion may propagate from the third port 135c to the first port 135a and be phase-shifted +90 degrees. As such, at the first port 135a, the first portion and the second portion may be out of phase by 180 degrees, and destructively combine. As such, signal leakage to the antenna tuner 136 may be reduced or eliminated. In another example, the fourth port 135d may receive an RX signal (e.g., to propagate to the receiver 54) and split the signal into a first portion and a second portion. The first portion may propagate to the second port 135b and be phase-shifted +90 degrees and the second portion may propagate to the third port 135c and be phase-shifted +0 degrees.

As illustrated, the antenna tuner 136 may be coupled to the 90 degree hybrid coupler 134 opposite the antenna 55 and adjust an input impedance to offset an impedance mismatch between the impedance of the antenna 55 and the impedance of the isolation circuitry 59. In certain instances, the impedance of the antenna 55 may change, causing an impedance mismatch to occur since the impedance of the antenna 55 may not match the impedance of the isolation circuitry 59. The impedance mismatch may reduce the effectiveness (e.g., isolation, insertion loss) of the isolation circuitry 59 (e.g., 90 degree hybrid coupler 100) for providing isolation between the transmitter 52 and the receiver 54.

Advantageously, the antenna tuner 136 may match the impedance of the antenna, thereby reducing or eliminating the impedance mismatch condition. The antenna tuner 136 may include resistive elements (e.g., resistors), capacitive elements (e.g., capacitors), and/or inductive elements (e.g., inductors) that may be configurable (e.g. tunable) to match an impedance of the antenna 55. Any or all of the components of the antenna tuner 136 may be tunable or adjustable. In an embodiment, the antenna tuner 136 may include circuitry similar to the impedance tuner 120 described with respect to FIG. 7. For example, antenna tuner 136 (e.g., the variable capacitors of the antenna tuner 136) may be configured (e.g., adjusted, tuned) to adjust (e.g., lower, raise, maintain) an impedance at the first port 135a of the 90 degree hybrid coupler 134 (e.g., to match an impedance at the fourth port 135d of the 90 degree hybrid coupler 134 coupled to the antenna 55). In other embodiments, the antenna tuner 136 may be include a resistive element (e.g., resistor) coupled to the ground or any suitable circuitry to match the impedance of the antenna 55. In this way, the impedance of the isolation circuitry 59 may match an impedance of the antenna 55 and/or the combiner circuitry 106.

Figure 10:
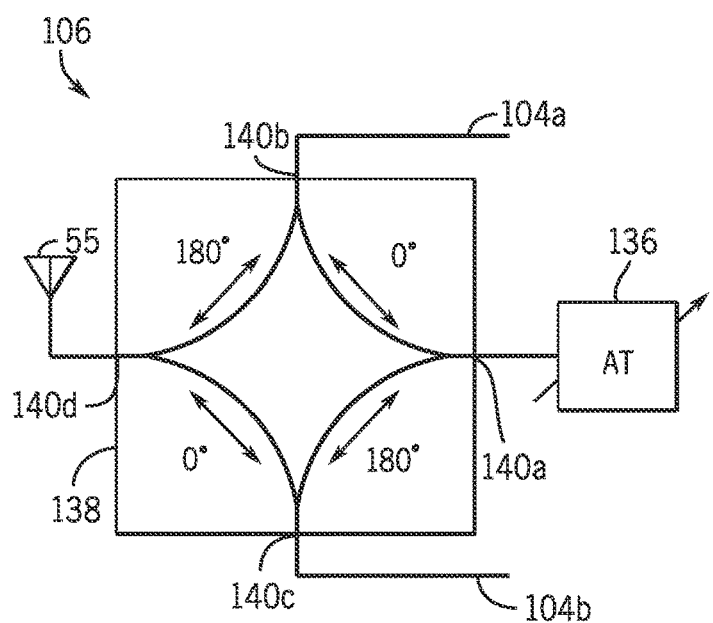
FIG. 10 is a circuit diagram of combiner circuitry in the form of a 180 degree isolator and the antenna tuner, according to embodiments of the present disclosure.

FIG. 10 is a circuit diagram of the combiner circuitry 106 in the form of a 180 degree isolator 138 and the antenna tuner 136, according to embodiments of the present disclosure. In an embodiment, the combiner circuitry 106 may include a 180 degree isolator 138 coupled to an antenna tuner 136. The 180 degree isolator 138 may include a first port 140a, a second port 140b, a third port 140c, and a fourth port 140d (collectively referred to as ports 140); the ports 140 may allow for four connections, such as to the antenna 55, the first phase shifter 102a, the second phase shifter 102b, and the antenna tuner 136. Indeed, each port 140 may operate as an input for an incoming signal and may output the incoming signal to an adjacent port, but may not output the incoming signal to the opposite port based on signal pathways of the 180 degree isolator 138.

For example, the 180 degree isolator 138 may receive a first portion of the TX signal at the second port 140*b* and a second portion of the TX signal at the third port 140*c*. In certain instances, the first portion and the second portion may be phase-shifted by the phase shifters 102 such that the first portion and the second portion are substantially in phase. For example, the first portion and the second portion may be split by the 90 degree hybrid coupler 100, such that the second portion is +90 degrees out-of-phase with respect to the first portion. The first phase shifter 102*a* may then phase-shift the first portion by, for example, −180 degrees, and the second phase shifter 102*b* may phase-shift the second portion by the second phase shifter 102*b* by −270 degrees, such that the first portion and the second portion are in phase. The 180 degree isolator 138 may phase-shift the first portion and the second portion by 0 degrees and propagate the portions to the fourth port 140*d*. As such, the first portion of the signal and the second portion of the signal may be in phase (e.g., have 0 degree phase difference) and constructively combine before propagating to the antenna 55.

In certain instances, the first portion and the second portion of the TX signal may attempt to leak or propagate to the first port 140*a* coupled to the antenna tuner 136. In such cases, the first portion may propagate from the second port 140*b* to the first port 140*a* and be phase shifted 0 degrees, while the second portion may propagate from the third port 140*c* to the first port 140*a* and be phase shifted +180 degrees. As such, at the first port 140*a*, the first portion and the second portion may be out of phase (e.g., by 180 degrees) and destructively combine. Accordingly, signal leakage to the antenna tuner 136 may be reduced or eliminated. In another example, the fourth port 140*d* may receive the RX signal and split the signal into a first portion and a second portion. The first portion and the second portion may be substantially in phase. The first portion may propagate to the second port 140*b* of the 180 degree isolator 138 and be phase-shifted 0 degrees and the second portion may propagate to the third port 140*c* 180 degree isolator 138 and be phase-shifted 0 degrees.

As described with respect to FIG. 9, the antenna tuner 136 may match or mirror the impedance of the antenna 55 to balance the impedance between the isolation circuitry 59 and the antenna 55. The antenna tuner 136 may be coupled to the 180 degree isolator 138 opposite the antenna 55 and adjust an input impedance to balance the 180 degree isolator 138. The antenna tuner 136 may include one or more resistive elements (e.g., resistors), one or more capacitive elements (e.g., capacitors), one or more inductive elements (e.g., inductors), or any other suitable circuitry to provide a desired impedance. Any or all components of the antenna tuner 136 may be tunable or adjustable. For example, as illustrated, the antenna tuner 136 may include a resistor coupled to a ground, four variable capacitors respectively coupled to the ground, and three inductors. The antenna tuner 136 (e.g., the variable capacitors of the antenna tuner 136) may be configured (e.g., adjusted, tuned) to adjust (e.g., lower, raise, maintain) an impedance at a port 140 of the 180 degree isolator 138 (e.g., to match an impedance at another port 140 of the 180 degree isolator 138). Accordingly, the input impedance of the 180 degree hybrid 138 may be balanced and isolation between the antenna and the isolation circuitry 59 may be maintained.

Figure 11:
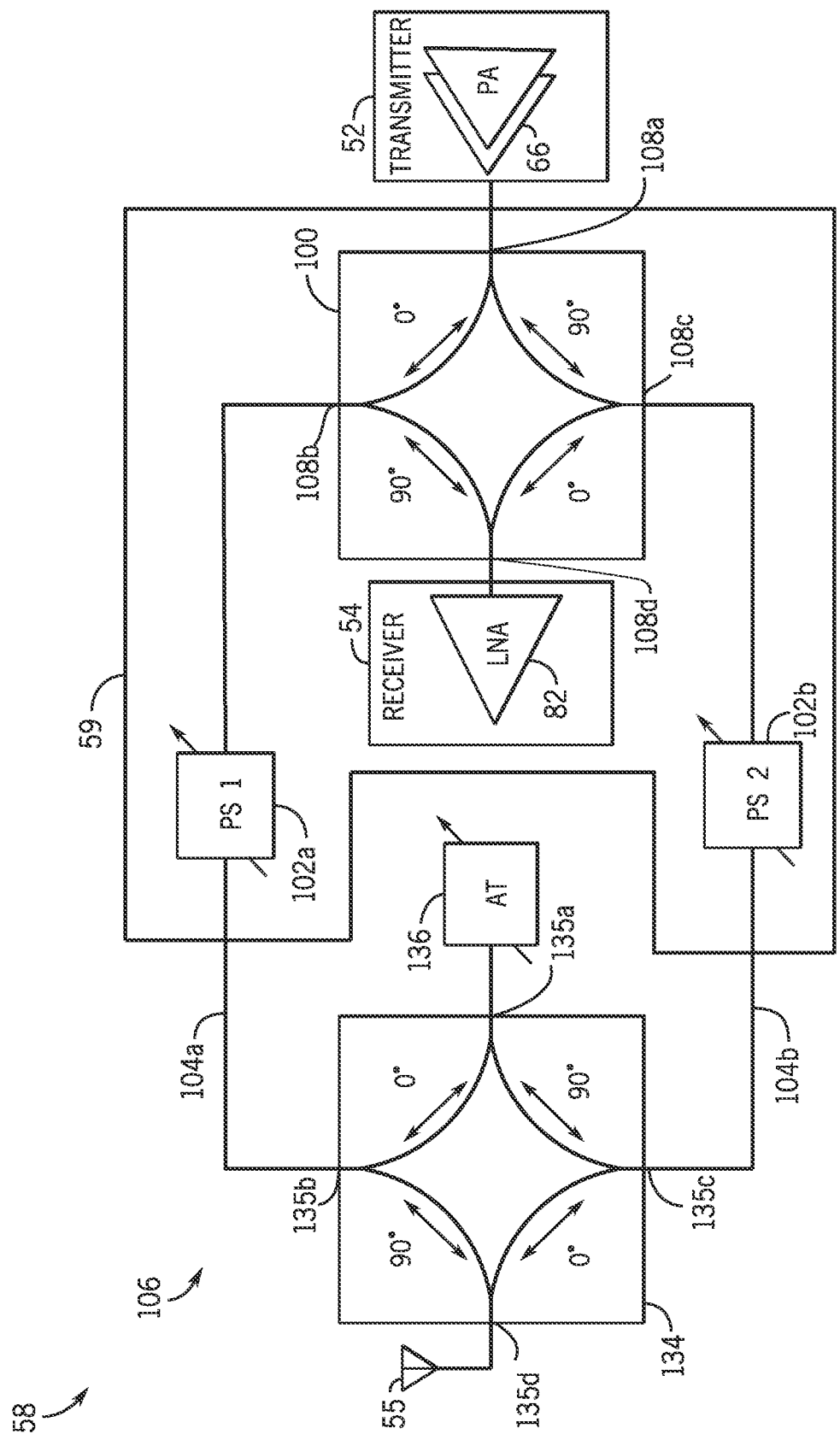
FIG. 11 is a circuit diagram of the RFFE of FIG. 6 and the combiner circuitry of FIG. 9, according to embodiments of the present disclosure.

In additional or alternative embodiments, the one or more tunable components may be adjusted based on the signals received at the antenna 55, the signals transmitted via the transmitter 52, and/or a desired target isolation range and target insertion loss range associated with the transmitter 52, the receiver 53, and/or the antenna 55. By way of example, FIG. 11 is a circuit diagram of the RFFE 58 having isolation circuitry 59 and combiner circuitry 106, according to embodiments of the present disclosure. Although not shown, the impedance tuners 120 described with respect to FIG. 7 may be included in the isolation circuitry 59 to balance the input impedances of the 90 degree hybrid coupler 100.

As discussed above, the transmitter 52 may provide a TX signal to the isolation circuitry 59 to be transmitted via the antenna 55. In addition to preventing the RX signal from entering the transmitter 52, the isolation circuitry 59 also splits the TX signal into a first portion and a second portion. For example, the TX signal may enter the first port 108*a* of the 90 degree hybrid coupler 100 and be split into the first portion and the second portion. The first portion may propagate to the second port 108*b* and the first phase shifter 102*a* via the first path 104*a*. The second portion may be phase-shifted +90 degrees and propagate to the third port 108*c* and the second phase shifter 102*b* via the second path 104*b*. The phase shifters 102 may phase-shift the portion of the signal prior to propagating to the combiner circuitry 106.

As illustrated, the combiner circuitry 106 may include a 90 degree hybrid coupler 134 coupled to the antenna tuner 136 via the first port 135*a*, the first phase shifter 102*a* via the second port 135*b*, the second phase shifter 102*b* via the third port 135*c*, the antenna 55 via the fourth port 135*d*. The first portion of the TX signal may enter the second port 135*b* of the 90 degree hybrid coupler 134 and be phase-shifted +90 degrees and the second portion may enter the third port 135*c* and be phase-shifted 0 degrees. The portions may be constructively combined at the fourth port 135*d* prior to propagating to the antenna 55. In this way, the power lost by splitting the TX signal may be recovered, thereby reducing or eliminating insertion loss caused by the isolation circuitry 59. Additionally or alternatively, the first portion of the TX signal and the second portion of the TX signal may attempt to leak or propagate to the first port 135*a*. In such cases, the first portion may be phase-shifted 0 degrees and the second portion may be phase-shifted +90 degrees, causing the first portion and the second portion to be 180 degrees out of phase and destructively combine.

In certain embodiments, the isolation circuitry 59 may include impedance tuners 120 discussed with respect to FIG. 6. Including additional tunable components may allow for greater freedom in tuning the RFFE 58 circuit. It should be understood that combiner circuitry 106 of the RFFE 58 illustrated in FIG. 9 is merely one of example, and any suitable layout that divides a signal or combines a signal may be substituted. For example, the combiner circuitry 106 may include passive circuitry, direct connections (e.g., star crossing), a Wilkinson power divider 129 described with respect to FIG. 8, a 180 degree isolator 138 described with respect to FIG. 10, or the like.

Furthermore, the RFFE 58 described with respect to FIG. 11 may operate in different frequency ranges (e.g., different transmission frequency ranges, different receiver frequency ranges). For example, the processor 12 may receive an indication from a base station of the transmission frequency range and/or the receiver frequency range. The processor 12 may set the frequency ranges of the RFFE 58 by setting the transmitter filter 68 and the receiver filter 84. Further, each phase shifter 102 may shift a different amount of phase depending on a frequency of an input signal. At a transition frequency, the phase shifter 102 may transition from shifting from a first amount of phase to a second amount of phase. For example, the phase shifter 102 may shift an input signal 0 degrees when its frequency is less than 1 gigahertz (GHz) and shift an input signal −90 degrees when its frequency is greater than 1 GHz. As such, the transition frequency for the phase shifter is 1 GHz. The transition frequencies of the phase shifters 102 may be adjusted based on the transmission frequency ranges and/or the receiver frequency ranges. FIGS. 10, 11, and 12 illustrate a relationship between adjusting the transition frequency of the phase shifters 102 and an insertion loss of the transmitter 52, the receiver 54, and isolation between the transmitter 52, the receiver 54, and the antennas 55.

Figure 12:
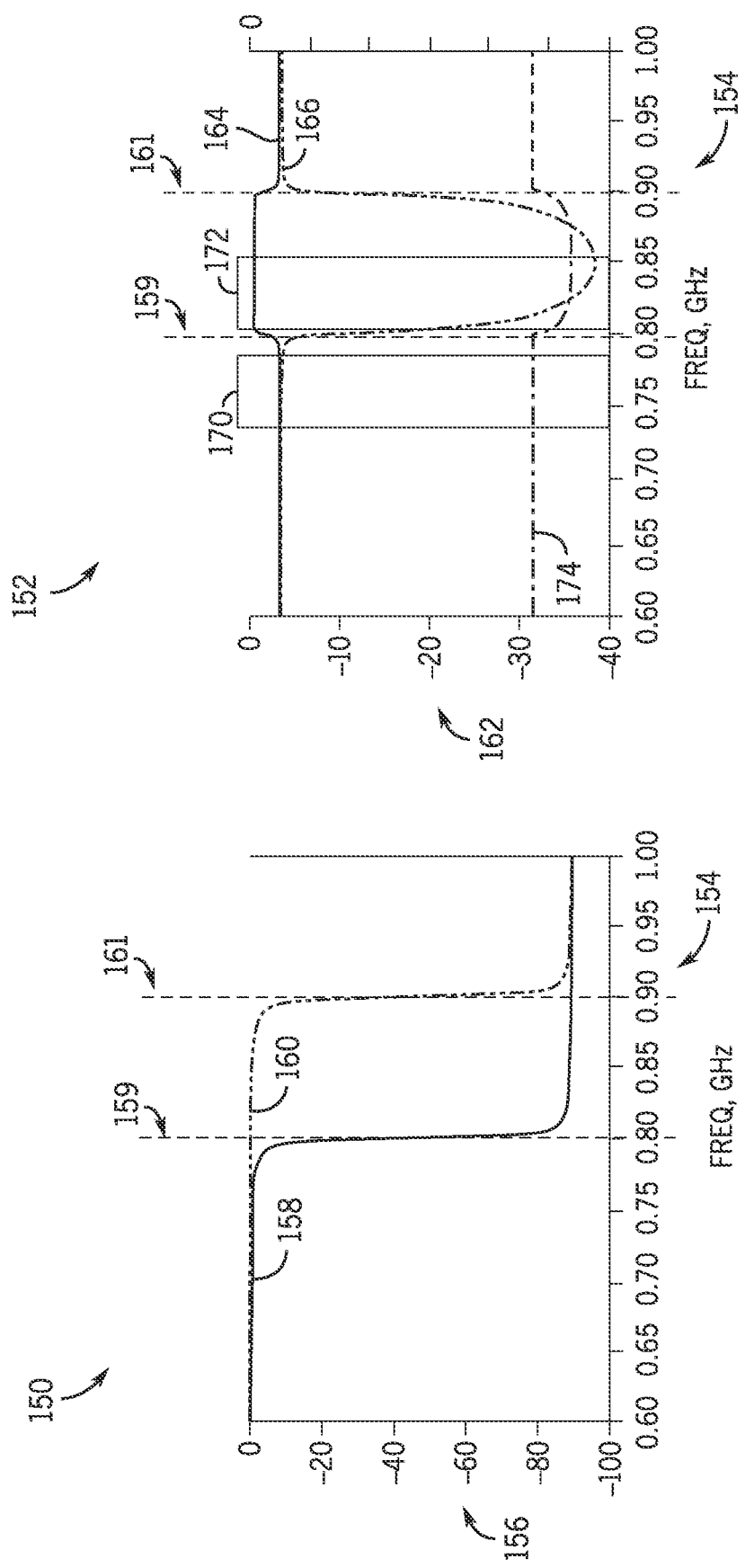
FIG. 12 illustrates a first plot illustrating first and second transition frequencies of two phase shifters having 0 degree phase shifts at low frequencies and −90 degree phase shifts at high frequencies, and a second plot illustrating a first frequency range for uplink or downlink being less than a first transition frequency, which is less than a second frequency range for uplink or downlink, which is less than a second transition frequency, according to embodiments of the present disclosure.

With the foregoing in mind, FIG. 12 illustrates a first plot 150 illustrating a first transition frequency 159 and a second transition frequency 161 of the phase shifters 102 having a 0 degree phase shifts at low frequencies and −90 degree phase shifts at high frequencies and a second plot 152 illustrating a first frequency range 170 for uplink or downlink being less than the first transition frequency 159, which is less than a second frequency range 172 for uplink or downlink, which is less than the second transition frequency 161, according to embodiments of the present disclosure. For example, the first phase shifter 102a and the second phase shifter 102b may provide different phase shifts at different frequencies and have different transition frequencies. As mentioned above, the transition frequency may be the frequency at which the phase shifter 102 switches from the first amount of phase to the second amount of phase. It should be understood that the phase shifters may have one or more transition frequencies, which might be in other frequency ranges not illustrated in FIG. 12. That is, any suitable transition frequencies may be contemplated. Additionally, the phase values below and above the transition frequencies of the phase shifters may not be constant due to, for example, manufacturing imperfections, environmental factors, or any non-ideal considerations. In certain instances, a non-constant phase value below and/or above the transition frequencies may be desired. In certain instances, the transition frequency may not be a single frequency, but instead be a frequency range with a frequency bandwidth. This bandwidth may intersect or overlay with the first frequency range 170, the second frequency range 172, or both.

As illustrated, the first plot 150 includes a horizontal axis 154 representing frequency in gigahertz (GHz), and a vertical axis 156 representing phase. The first plot 150 illustrates an amount of phase shifted 158 by the first phase shifter 102a over frequency and an amount of phase-shifted 160 by the second phase shifter 102b over frequency. As illustrated, the first phase shifter 102a may be set to or have a first transition frequency 159 (e.g., of 800 MHz). Below the first transition frequency 159, the first phase shifter 102a may shift a phase of an input signal by 0 degrees, and above the transition frequency 159, the first phase shifter 102a may shift a phase of an input signal −90 degrees. The second phase shifter 102b may be set to or have a second transition frequency 161, which may be different from the first transition frequency 159. For example, the second phase shifter 102b may be set to or have a second transition frequency 161 (e.g., of 900 MHz). Below the second transition frequency 161, the second phase shifter 102b shift a phase of an input signal 0 degree and above the second transition frequency 161, the second phase shifter 102b may shift a phase of an input signal −90 degrees.

As illustrated, the second plot 152 includes the horizontal axis 154 representing frequency in gigahertz (GHz), and a vertical axis 162 representing power in decibels (dB). The second plot 152 illustrates a first insertion loss 164 (e.g., transmission insertion loss, receiver insertion loss), and a second insertion loss 166 (e.g., receiver insertion loss, transmission insertion loss). That is, the first insertion loss 164 may represent transmission insertion loss (e.g., power loss of a transmission signal sent to the antenna 55), and the second insertion loss 166 may represent receiver insertion loss (e.g., power loss of a received signal received at the antenna 55 and sent to the receiver 54), or vice versa, depending on the implementation of the RFFE 58. Also illustrated are the first transition frequency 159 and the second transition frequency 161.

For example, the receiver 54 of the electronic device 10 may receive wireless signals (e.g., downlink signals) over a first frequency range 170 (e.g., between 740 megahertz (MHz) and 780 MHz), and the transmitter 52 of the electronic device 10 may transmit wireless signals (e.g., uplink signals) over a second frequency range 172 (e.g., between 810 MHz and 850 MHz). It should be understood that the frequency ranges 170, 172 shown in FIG. 12 are only examples, and any other suitable frequency ranges are contemplated (including where the first frequency range 170 is a transmission frequency range, and the second frequency range 172 is a receive frequency range, as opposed to what is shown in FIG. 12).

The phase shifters 102 may be set to switch a phase at a transition frequency between the first frequency range 170 and the second frequency range 172 to improve insertion loss 164, 166. Indeed, as illustrated, the first transition frequency 159 of the first phase shifter 102a may not fall in the first frequency range 170 nor the second frequency range 172. Similarly, the second transition frequency 161 may not fall in the first frequency range 170 nor the second frequency range 172.

It should be understood that the relative positions of the first transition frequency 159 and second transition frequency 161 described with respect to FIG. 12 are only examples, and any suitable transition frequencies are contemplated. Assuming the first frequency range 170 is at a lower frequency than the second frequency range 172, the first transition frequency 159 may be at lower frequencies ranges in comparison to the first frequency range 170. Further, the second transition frequency 161 may be higher than the first frequency range 170 but lower than the second frequency range 172. Alternatively, the first transition frequency 159 may be higher than the first frequency range 170 but lower than the second frequency range 172, and the second transition frequency 161 may be higher than the second frequency range 172. Additionally, any suitable combination of the transition frequencies and/or frequency ranges may be possible. Further, any suitable combination of the transition frequencies and/or frequency ranges described with respect to FIGS. 13 and 14 may be possible.

By configuring the first phase shifter 102a and the second phase shifter 102b in this manner, insertion loss 164, 166 may be decreased or minimized. For example, the second insertion loss 166 at the first frequency range 170 may be −5 dB or greater, −6 dB or greater, −7 dB or greater, −8 dB or greater, and so on. Indeed, as illustrated, the first insertion loss 164 is greater than −1 dB. Similarly, the first insertion loss 164 at the second frequency range 172 may be −1 dB or greater, −2 dB or greater, −3 dB or greater, −4 dB or greater, and so on. Indeed, as illustrated, the second insertion loss 166 is greater than −30 dB. In this way, the insertion loss 164, 166 may be improved for both the transmitter 52 and the receiver 54 over transmission and receive frequency ranges (e.g., 170, 172).

Additionally, isolation 174 as performed by the isolation circuitry 59 may be decreased or minimized at the frequency ranges 170, 172. For example, the isolation 174 at the first frequency range 170 may be −30 dB or less, −33 dB or less, −34 dB or less, −35 dB or less, −40 dB or less, and so on. The isolation 174 in the second frequency range 172 may be −35 dB or less, −38 dB or less, −40 dB or less, and so on. Moreover, as illustrated, the isolation circuitry 59 (e.g., 90 degree duplexer 100) exhibits isolation 174 across a wide bandwidth. That is, the isolation 174 is generally steady across the illustrated bandwidth of 730 MHz to 860 MHz, and indeed over a bandwidth greater than the illustrated bandwidth. For example, the isolation 174 may have a maximum value of −32 dB or less, −32 dB or less, −34 dB or less, and so on. As further described with respect to FIGS. 13 and 14, configuring the transition frequency 159, 161 of the first phase shifter 102a and the second phase shifter 102b may change the insertion loss 164, 166 and/or isolation 174.

It should be understood that the transition frequencies (e.g., 800 MHz, 900 MHz) described with respect to FIGS. 10, 11, and 12 are only examples, and any suitable transition frequencies are contemplated. Further, the phase-shifts (e.g., 0 degree, −90 degrees, −180 degrees, −270 degrees, −360 degrees) described with respect to FIGS. 10, 11, and 12 are only examples, and any suitable phase-shift may be contemplated. Additionally, the transmitter loss, receiver loss, and isolation values described with respect to FIGS. 10, 11, and 12 are only examples to show a relationship between the phase shifter functionality, the isolation loss, and the isolation of the RFFE 58.

Figure 13:
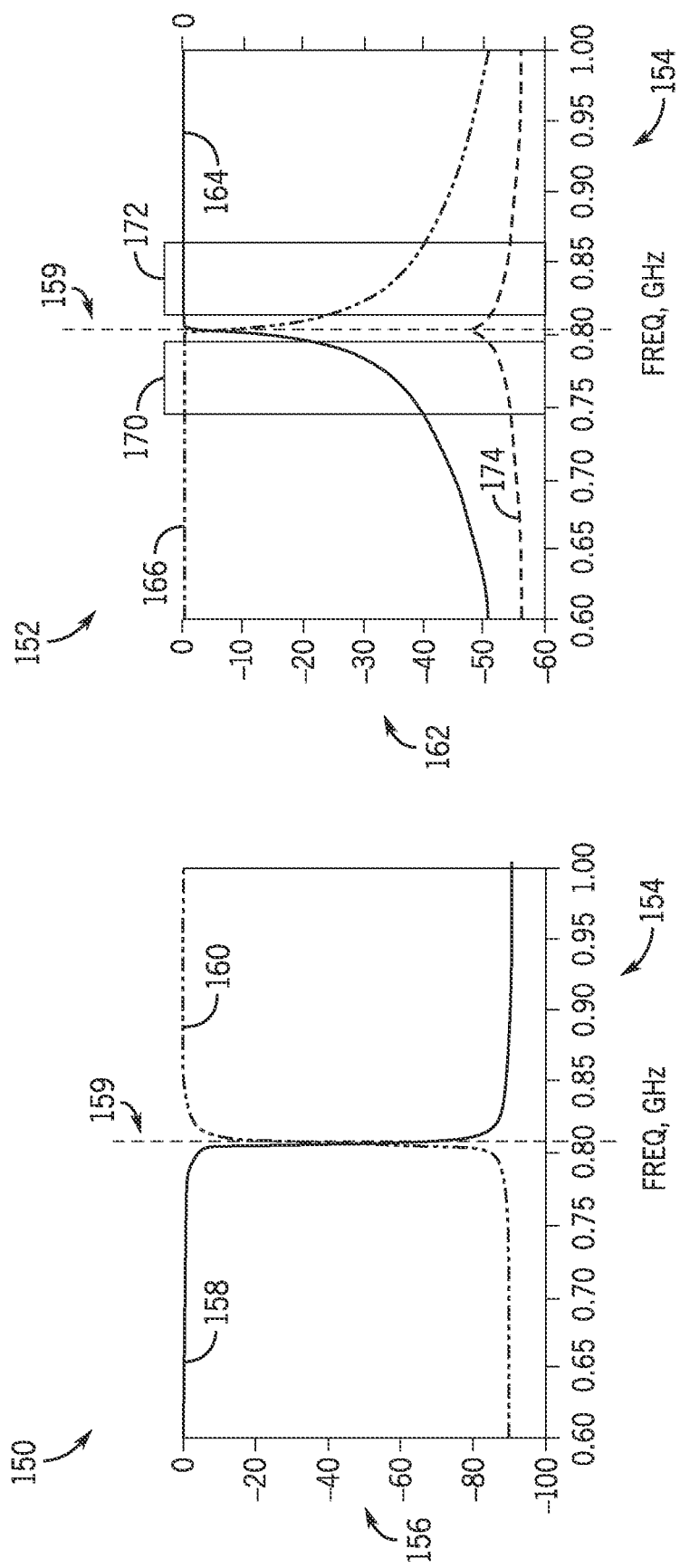
FIG. 13 illustrates a first plot illustrating a same transition frequency of a first phase shifter having 0 degree phase shift at low frequencies and a −90 degree phase shift at high frequencies and of a second phase shifter having −90 degree phase shift at low frequencies and a 0 degree phase shift at high frequencies, and a second plot illustrating a first frequency range for uplink or downlink being less than the transition frequency of the first phase shifter and the second phase shifter, which is less than a second frequency range for uplink or downlink, according to embodiments of the present disclosure.

FIG. 13 illustrates a first plot 150 illustrating a same transition frequency 159 of the first phase shifter 102a having 0 degree phase shift at low frequencies and a −90 degree phase shift at high frequencies and of the second phase shifter 102b having −90 degree phase shift at low frequencies and a 0 degree phase shift at high frequencies and a second plot 152 illustrating a first frequency range 170 for uplink or downlink being less than the transition frequency 159 of the first phase shifter 102a and the second phase shifter 102b, which is less than the second frequency range 172 for uplink or downlink, according to embodiments of the present disclosure. As illustrated, the first plot 150 includes a horizontal axis 154 representing frequency in gigahertz (GHz), and a vertical axis 156 representing phase. In certain instances, the first phase shifter 102a and the second phase shifter 102b may provide different phase shifts at a frequency and be set to or have a same transition frequency 159. The first plot 150 illustrates an amount of phase-shifted 158 by the first phase shifter 102a over frequency and an amount of phase shifted 160 by the second phase shifter 102b over frequency. As illustrated, the first phase shifter 102a and the second phase shifter 102b may. For example, the phase shifters 102 may be set or have the same transition frequency 159 (e.g., of 800 MHz). Below the transition frequency 159, the first phase shifter 102a may shift a phase of an input signal 0 degrees and above the transition frequency 159, the first phase shifter 102a may shift a phase of an input signal −90 degrees. Further, below the transition frequency 159, the second phase shifter 102b may shift a phase of an input signal −90 degrees and above the transition frequency 159, the second phase shifter 102b may shift a phase of an input signal 0 degrees.

As described with respect to FIG. 10, the second plot 152 includes the horizontal axis 154 representing frequency in gigahertz (GHz), and the vertical axis 162 representing power in decibels (dB). The second plot 152 illustrates a first insertion loss 164 and a second insertion loss 166. Also illustrated are the transition frequency 159 and the isolation 174. As described with respect to FIG. 10, the first frequency range 170 may be between 740 MHz and 780 MHz and the second frequency range 172 may be between 810 MHz and 850 MHz. Further, the phase shifters 102 may be set to or have the transition frequency 159 between the first frequency range 170 and the second frequency range 172.

Indeed, configuring the first phase shifter 102a and the second phase shifter 102b in this manner may decrease or minimize insertion loss 164, 166. For example, the second insertion loss 166 at the first frequency range 170 may be 0 dB or less, −1 dB or less, −2 dB or less, and so on and the first insertion loss 164 may be greater than −10 dB Similarly, the first insertion loss 164 at the second frequency range 172 may be 0 dB or less, −1 dB or less, −2 dB or less, and so on and the second insertion loss 166 may be greater than −10 dB. In this way, the insertion loss 164, 166 may be improved for both the transmitter 52 and the receiver 54 over transmission and receive frequency ranges (e.g., 170, 172).

Additionally, isolation 174 of the isolation circuitry 59 (e.g., 90 degree duplexer 100) may be generally steady across the first frequency range 170 and the second frequency range 172. For example, the isolation 174 may be −50 dB or less, −51 dB or less, −52 dB or less, and so across the illustrated bandwidth of 730 MHz to 860 MHz, and indeed over a bandwidth greater than the illustrated bandwidth. Further, at the transition frequency 159, the isolation 174 may be −49 dB or less, −51 dB or less, −53 dB or less, and so on.

Figure 14:
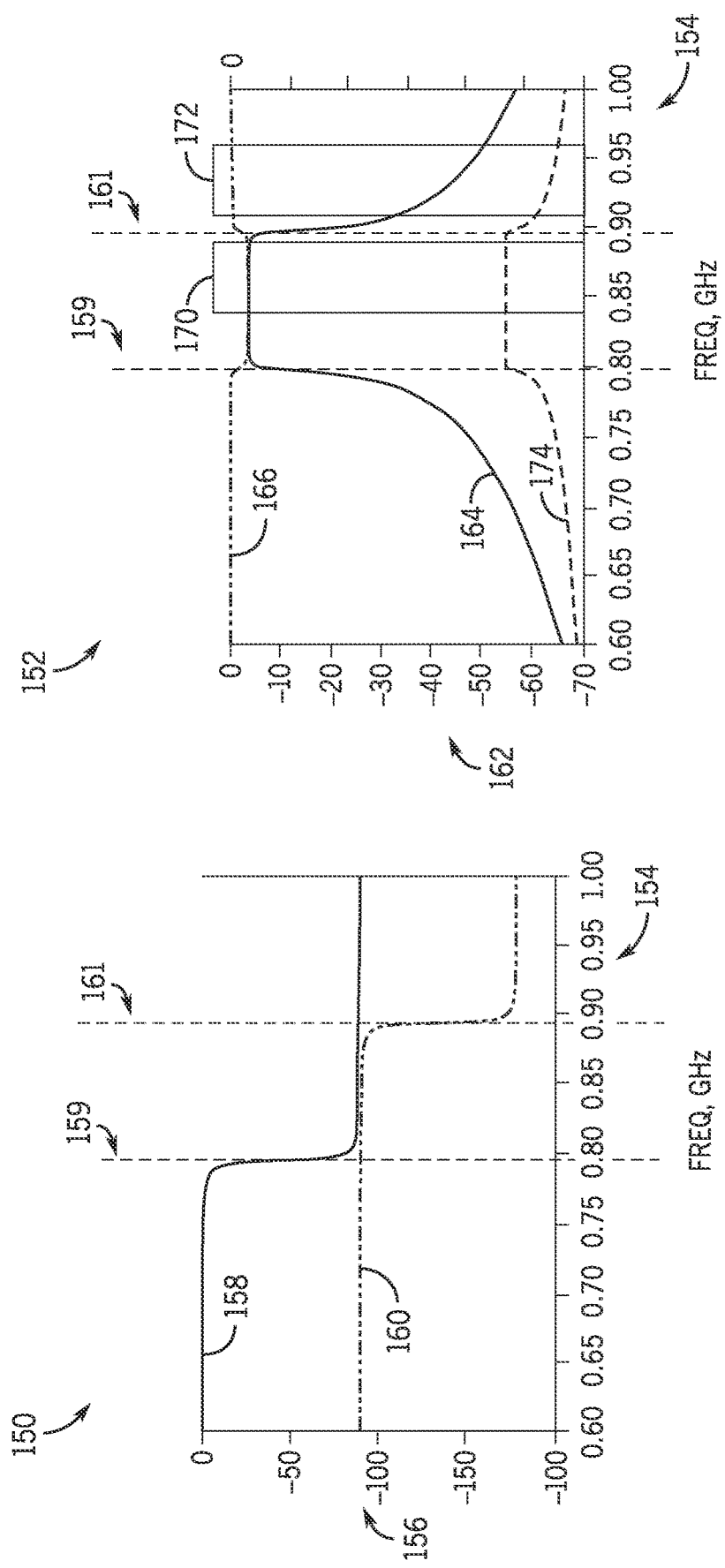
FIG. 14 illustrates a first plot illustrating a first transition frequency of a first phase shifter having a 0 degree phase shift at low frequencies and a −90 degree phase shift at high frequencies and a second transition frequency of a second phase shifter having −90 degree phase shift at low frequencies and −180 degree phase shift at high frequencies, and a second plot illustrating the first transition frequency being less than a first frequency range for uplink or downlink, which less than the second transition frequency, which is less than a second frequency range for uplink or downlink, according to embodiments of the present disclosure.

FIG. 14 illustrates a first plot 150 illustrating a first transition frequency 159 of the first phase shifter 102a having a 0 degree phase shift at low frequencies and a −90 degree phase at high frequencies and the transition frequency 161 of the second phase shifter 102b having −90 degree phase shift at low frequencies and −180 degree phase shift at high frequencies and a second plot 152 illustrating the first transition frequency 159 being less than a first frequency range 180 for uplink or downlink, which is less than the second transition frequency 191, which is less than a second frequency range 182 for uplink or downlink, according to embodiments of the present disclosure. As described herein, the first phase shifter 102a and the second phase shifter 102b may provide different phase shifts at different frequencies and have different transition frequencies. As illustrated, the first plot 150 includes a horizontal axis 154 representing frequency in gigahertz (GHz), and a vertical axis 156 representing phase. The first plot 150 illustrates an amount of phase-shifted 158 by the first phase shifter 102a over frequency and an amount of phase-shifted 160 by the second phase shifter 102b over frequency. As illustrated, the first phase shifter 102a may be set to or have a first transition frequency 159 (e.g., of 800 MHz) and the second phase shifter 102b may be set to or have a second transition frequency 161 (e.g., of 900 MHz). Below the first transition frequency 159, the first phase shifter 102a may shift a phase of an input signal 0 degrees and above the first transition frequency 159, the first phase shifter 102a may shift a phase of an input signal −90 degrees. Further, the second phase shifter 102b may shift a phase of an input signal −90 degrees below the second transition frequency 161 and shift a phase of an input signal −180 degrees above the second transition frequency 161.

As illustrated, the second plot 152 includes a horizontal axis 154 representing frequency in gigahertz (GHz), and a vertical axis 162 representing a power in decibels (dB). The second plot 152 illustrates a first insertion loss 164 (e.g., transmission insertion loss, receiver insertion loss), and a second insertion loss 166 (e.g., receiver insertion loss, transmission insertion loss). As described with respect to FIG. 12, the first insertion loss 164 may represent transmission loss (e.g., power loss of a transmission signal sent to the antenna 55), and the second insertion loss 166 may represent receiver insertion loss (e.g., power loss of a received signal received at the antenna 55 and sent to the receiver 54), or vice versa, depending on the implementation of the RFFE 58. Furthermore, the first transition frequency 159 and the second transition frequency 161 are illustrated.

For example, the receiver 54 of the electronic device 10 may receive wireless signals over a second frequency range 180 (e.g., between 840 MHz to 890 MHz), and transmitter 52 may transmit wireless signals over a second frequency range 182 (e.g., between 910 MHz and 960 MHz). It should be understood that the frequency ranges 180, 182 shown in FIG. 14 are only examples, and any other suitable ranges are contemplated (including where the first frequency range 180 is a transmission frequency range, and the second frequency range 182 is a receive frequency range, as opposed to what is shown in FIG. 12). As described herein, the relative position of the frequency ranges 170, 172, 180, and 182 and the transition frequencies 159 are only exemplary, and any other suitable arrangement of the transition frequencies and frequency ranges over the horizontal axis 154 (e.g., frequency) are possible.

The phase shifters 102 may switch a phase at a transition frequency 159, 161 between the first frequency range 180 and the second frequency range 182 to improve insertion loss 164, 166. Indeed, the first transition frequency 159 of the first phase shifter 102a may not fall in the first frequency range 180 nor the second frequency range 182. Similarly, the second transition frequency 161 may not fall in the first frequency range 180 or the second frequency range 182.

By configuring the first phase shifter 102a and the second phase shifter 102b in this manner, insertion loss 164, 166 may be decreased or minimized. As illustrated, the insertion loss 164, 166 may be broadband due to the transition frequencies 159, 161 of the phase shifters 102. For example, the first insertion loss 164 at the first frequency range 180 may be −5 dB or less, −10 dB or less, −20 dB or less, −30 dB or less, −40 dB or less, and so on. Indeed, as illustrated, the second insertion loss 166 is greater than −5 dB. Further, between the first transition frequency 159 and the second transition frequency 161, the first insertion loss 164 may be decreased or minimized. As such, it may be beneficial to prioritize (e.g., boost) the first insertion loss 164 at the frequency between the first transition frequency 159 and the second transition frequency 181. Indeed, as illustrated, the first insertion loss 164 at the second frequency range 182 may be −30 dB or less, −40 dB or less, −50 dB or less, and so on while the second insertion loss 166 in the second frequency range 182 may be 0 dB or less, −1 dB or less, −2 dB or less, and so on. As such, the second insertion loss 166 may be prioritized in the second frequency range 182. In this way, the insertion loss 164, 166 may be improved for both the transmitter 52 and the receiver 54 over the transmission and receiver frequency ranges (e.g., 180, 182).

Additionally, isolation 174 as performed by the isolation circuitry 59 may be decreased or minimized within between the first frequency range 180 and the second frequency range 182. For example, the isolation 174 at the first frequency range 180 may be −55 dB or less, −60 dB or less, −65 dB or less, and so on, while isolation 174 in the second frequency range 182 may be −62 dB or less, −65 dB or less, −68 dB or less, and so on. Indeed, the isolation 174 is generally steady at the frequency between the first transition frequency 159 and the second transition frequency 161 (e.g., of 800 MHz to 900 MHz). For example, the isolation 174 may have a maximum value of −55 dB or less, −60 dB or less, −65 dB or less, and so on. In this way, high isolation of the isolation circuitry 59 and low insertion loss between the transmitter 52, the receiver 54, and/or the antennas 55 may be achieved.

As used herein, machine-learning may refer to algorithms and statistical models that computer systems (e.g., including the electronic device 10) use to perform a specific task with or without using explicit instructions. For example, a machine-learning process may generate a mathematical model based on a sample of data, known as "training data," in order to make predictions or decisions without being explicitly programmed to perform the task.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A communication device, comprising:
one or more antennas;
a transmit circuit;
a receive circuit;
splitter circuitry coupled to the one or more antennas, the splitter circuitry configured to split a signal received at the one or more antennas into a first portion and a second portion;
at least one phase shifter coupled to the splitter circuitry, the at least one phase shifter configured to shift the first portion of the signal; and
a 90 degree hybrid coupler comprising a plurality of ports, the 90 degree hybrid coupler coupled to
the at least one phase shifter via a first port of the plurality of ports,
the transmit circuit via a second port of the plurality of ports, and
the receive circuit via a third port of the plurality of ports, the 90 degree hybrid coupler configured to shift the first portion of the signal and constructively combine the first portion of the signal and the second portion of the signal.

2. The communication device of claim 1, comprising a first impedance tuner coupled to the 90 degree hybrid coupler via the first port, and a second impedance tuner coupled to the 90 degree hybrid coupler via a fourth port of the plurality of ports, the first impedance tuner configured to adjust a first input impedance of the first port and the second impedance tuner configured to adjust a second input impedance of the fourth port to balance the first input impedance and the second input impedance of the 90 degree hybrid coupler.

3. The communication device of claim 1, comprising an antenna tuner coupled to the splitter circuitry, the splitter circuitry comprising a 180 degree isolator, the antenna tuner configured to match an impedance of the one or more antennas.

4. The communication device of claim 3, wherein the 180 degree isolator is configured to shift the second portion of the signal to destructively combine the second portion of the signal with the first portion of the signal to reduce signal transmission to the antenna tuner.

5. The communication device of claim 1, comprising an antenna tuner coupled to the splitter circuitry, the splitter circuitry comprising a second 90 degree hybrid coupler, the antenna tuner configured to match an impedance of the one or more antennas.

6. The communication device of claim 5, wherein the second 90 degree hybrid coupler is configured to split the signal received by the one or more antennas into the first portion of the signal and the second portion of the signal and shift the first portion of the signal.

7. The communication device of claim 1, wherein the 90 degree hybrid coupler is configured to shift the second portion of the signal to destructively combine the second portion of the signal with the first portion of the signal to reduce signal transmission to the transmit circuit.

8. The communication device of claim 1, wherein the at least one phase shifter comprises a transition frequency that is set based on a transmission frequency associated with the transmit circuit and a receive frequency associated with the receive circuit.

9. A communication device comprising
one or more antennas;
a transmit circuit;
a receive circuit; and
isolation circuitry coupled to the one or more antennas, the transmit circuit, and the receive circuit, the isolation circuitry comprising a 90 degree hybrid coupler and at least one phase shifter, the 90 degree hybrid coupler coupled to
the at least one phase shifter via a first port of a plurality of ports of the 90 degree hybrid coupler,
the transmit circuit via a second port of the plurality of ports, and
the receive circuit via a third port of the plurality of ports,
the 90 degree hybrid coupler configured to receive a signal from the transmit circuit via the first port, split the signal into a first portion and a second portion, phase-shift the first portion of the signal, and the at least one phase shifter configured to phase-shift the second portion of the signal such that the first portion and the second portion are in phase.

10. The communication device of claim 9, wherein the isolation circuitry comprises at least one impedance tuner coupled to the 90 degree hybrid coupler via at least one port of the plurality of ports, the at least one impedance tuner configured to balance an input impedance of the 90 degree hybrid coupler.

11. The communication device of claim 9, comprising combiner circuitry coupled to the one or more antennas and the at least one phase shifter, the combiner circuitry comprising a second 90 degree hybrid coupler configured to phase-shift the first portion and constructively combine the first portion of the signal and the second portion of the signal prior to propagating the signal to the one or more antennas.

12. The communication device of claim 11, wherein the combiner circuitry comprises an antenna tuner coupled to the second 90 degree hybrid coupler opposite the one or more antennas, the antenna tuner configured to match an impedance of the one or more antennas.

13. The communication device of claim 11, wherein the combiner circuitry comprises a 180 degree isolator configured to phase-shift the second portion of the signal to destructively combine the second portion of the signal with the first portion of the signal.

14. Isolation circuitry comprising:
at least one phase shifter coupled to one or more antennas and configured to phase-shift a first portion of a receive signal from the one or more antennas, a second portion of the receive signal, or both; and
a 90 degree hybrid coupler comprising
a first port coupled to the at least one phase shifter,
a second port coupled to a transmit circuit, and
a third port coupled to a receive circuit, the 90 degree hybrid coupler configured to combine the first portion and the second portion of the receive signal and the second portion of the receive signal, and split a transmission signal from the transmit circuit.

15. The isolation circuitry of claim 14, wherein the 90 degree hybrid coupler is configured to split the transmission signal into a first portion and a second portion and phase-shift the first portion of the transmission signal.

16. The isolation circuitry of claim 15, comprising combiner circuitry coupled to the at least one phase shifter, the at least one phase shifter configured to phase-shift the first portion of the transmission signal, the second portion of the transmission signal, or both, such that first portion and the second portion are in phase.

17. The isolation circuitry of claim 16, wherein the combiner circuitry is configured to constructively combine the first portion and the second portion.

18. The isolation circuitry of claim 14, wherein the 90 degree hybrid coupler is configured to phase-shift the first portion of the receive signal to constructively combine the first portion of the receive signal and the second portion of the receive signal prior to propagating the receive signal to the receive circuit.

19. The communication device of claim 11, wherein the combiner circuitry is configured to receive a receive signal from the one or more antennas and split the receive signal into a first portion of the receive signal and a second portion of the receive signal, and wherein the 90 degree hybrid coupler is configured to phase-shift the second portion of the receive signal to destructively combine the second portion of the receive signal with the first portion of the receive signal to reduce signal transmission to the transmit circuit.

20. The isolation circuitry of claim 14, wherein the 90 degree hybrid coupler is configured to destructively combine the second portion of the receive signal with the first portion of the receive signal to reduce signal transmission to the transmit circuit.

\* \* \* \* \*